United States Patent

Hildebrand

[11] Patent Number: 5,937,934
[45] Date of Patent: Aug. 17, 1999

[54] SOIL HEAT EXCHANGER

[75] Inventor: Hans Hildebrand, Baar, Switzerland

[73] Assignee: Geohil AG, Hunenberg, Switzerland

[21] Appl. No.: 08/751,136

[22] Filed: Nov. 15, 1996

[51] Int. Cl.[6] .................................................. F28D 21/00
[52] U.S. Cl. ................. 165/45; 165/120; 165/DIG. 228; 60/641.2; 62/260
[58] Field of Search ........................ 165/45, 120; 62/260; 60/641.2, 641.3, 641.4

[56]   References Cited

U.S. PATENT DOCUMENTS

| | | | |
|---|---|---|---|
| 3,805,885 | 4/1974 | Van Huisen | 165/45 |
| 4,030,549 | 6/1977 | Bouck | 166/280 |
| 4,147,204 | 4/1979 | Pfenninger | 165/4 |
| 4,452,303 | 6/1984 | Bontje et al. | 165/142 |
| 4,741,388 | 5/1988 | Kuroiwa | 165/45 |
| 5,322,115 | 6/1994 | Hildebrand | 165/45 |

*Primary Examiner*—Allen J. Flanigan
*Attorney, Agent, or Firm*—Anderson, Kill & Olick, P.C.

[57]   ABSTRACT

A soil heat exchanger for effecting an energy exchange between earth soil and an energy exchanger and including a thermoinsulated flow duct arranged in a borehole formed in ground, a pump provided at an end of the flow duct, a shroud pipe surrounding the flow duct and the pump, and a return flow region for return water located radially outwardly of the shroud pipe and including return flow pipes and a porous filling, with the return flow pipe means extending down to a bottom of the borehole and having lateral opening means communicating with an interior of the shroud pipe through the inlet openings of the shroud pipe, with the shroud pipe having its lower end spaced from the bottom of the borehole, and with the lateral openings of the return flow pipes being beneath the lower end of the shroud pipe, and with the porous filling extending from the borehole bottom and at least up to a level above the inlet openings of the shroud pipe.

8 Claims, 1 Drawing Sheet

SOIL HEAT EXCHANGER

BACKGROUND OF THE INVENTION

1. Field of the Invention

The present invention relates to soil heat exchanger for effecting an energy exchange between earth soil and an energy exchanger and including a thermoinsulated supply flow duct arranged in a borehole formed in ground, a pump provided at an end of the supply flow duct; a shroud pipe surrounding the supply flow duct and the pump and having a plurality of inlet openings, and a return flow region for return water located radially outwardly of the shroud pipe and including return flow pipes connectable with the energy exchanger, and a porous filling, with the return flow pipes extending up to a bottom of the borehole and having lateral openings communicating with an interior of the shroud pipe through the inlet openings of the shroud pipe.

2. Description of the Prior Art

Apparatuses or heat exchangers of the above-described type are generally known, and one is disclosed in European Patent No. 0386176. Such an open, i.e., pressureless system, in which the supply flow conduit and the return flow conduit do not form any closed conduit system, has proved itself to be very good. However, when such an apparatus is used in a soil with loose geological layers or when the water is contaminated with impurities, there exists a danger that the inlet openings of the shroud pipe become blocked, and the circulation of return water with the delivery water is not possible any more or at least is accomplished with much difficulty.

Accordingly, an object of the invention is a soil heat exchanger of the above-described type in which the water circulation is reliably assured.

SUMMARY OF THE INVENTION

This and other objects of the present invention, which will become apparent hereinafter, are achieved by providing a soil heat exchanger in which the shroud pipe has a lower end thereof spaced from the bottom of the borehole, and the lateral openings of the return flow pipes are provided at least beneath the lower end of the shroud pipe, and in which the porous filling fills the borehole from the borehole bottom at least up to a level above the inlet openings of the shroud pipe.

Due to the fact that the outlet lateral openings of the return flow pipes are located beneath the lower end of the shroud pipe and that the porous filling extends to a level above the inlet openings of the shroud pipe, the return water, which exits the return flow pipe, is heated by surrounding environment and enters the inlet opening of the shroud pipe free of any deposit or other impurities, as the porous filling is free from any such sediment and impurities and can be adapted to clear the return water. This insures a reliable circulation even under unfavorable geological conditions and when the ground water is contaminated with sewage. The soil heat exchanger according to the present invention can be especially advantageously used at depth up to 100 m. With conventional apparatus, two such soil heat exchangers, spaced from each other, had to be used. Furthermore, the soil heat exchanger according to the present invention can to prevent penetration of the return water in deeper layers which in turn, prevents lowering of the groundwater level because of a hydraulic short-circuiting.

While the porous filling can extend up to the soil upper surface, it is however advantageous to provide a barrier layer extending above the porous filling. The barrier layer prevents or at least substantially reduces the penetration of the groundwater in the region of the porous filing. It is further advantageous when the barrier layer is formed of clay.

It is further advantageous when the wall of the borehole is formed by a metal pipe, preferably a steel pipe, though the use of plastic pipe is also possible. The pipe prevents penetration of the impurities and other solid materials in the borehole. Simultaneously, the metal pipe prevents penetration of the ground water into the borehole from upper layers of the soil.

The porous filling can be formed in different ways. However, it is preferable to form the porous filling of gravel, in particular, with a granule size from 2 to 8 mm.

BRIEF DESCRIPTION OF THE DRAWINGS

The objects and features of the present invention will become more apparent and the invention itself will be best understood from the following detailed description of the preferred embodiment when read with reference to the accompanying drawings, wherein:

Single figure shows a vertical cross sectional view of a soil heat exchanger according to the present invention.

DETAILED DESCRIPTION OF THE PREFERRED EMBODIMENT

Figure 1:
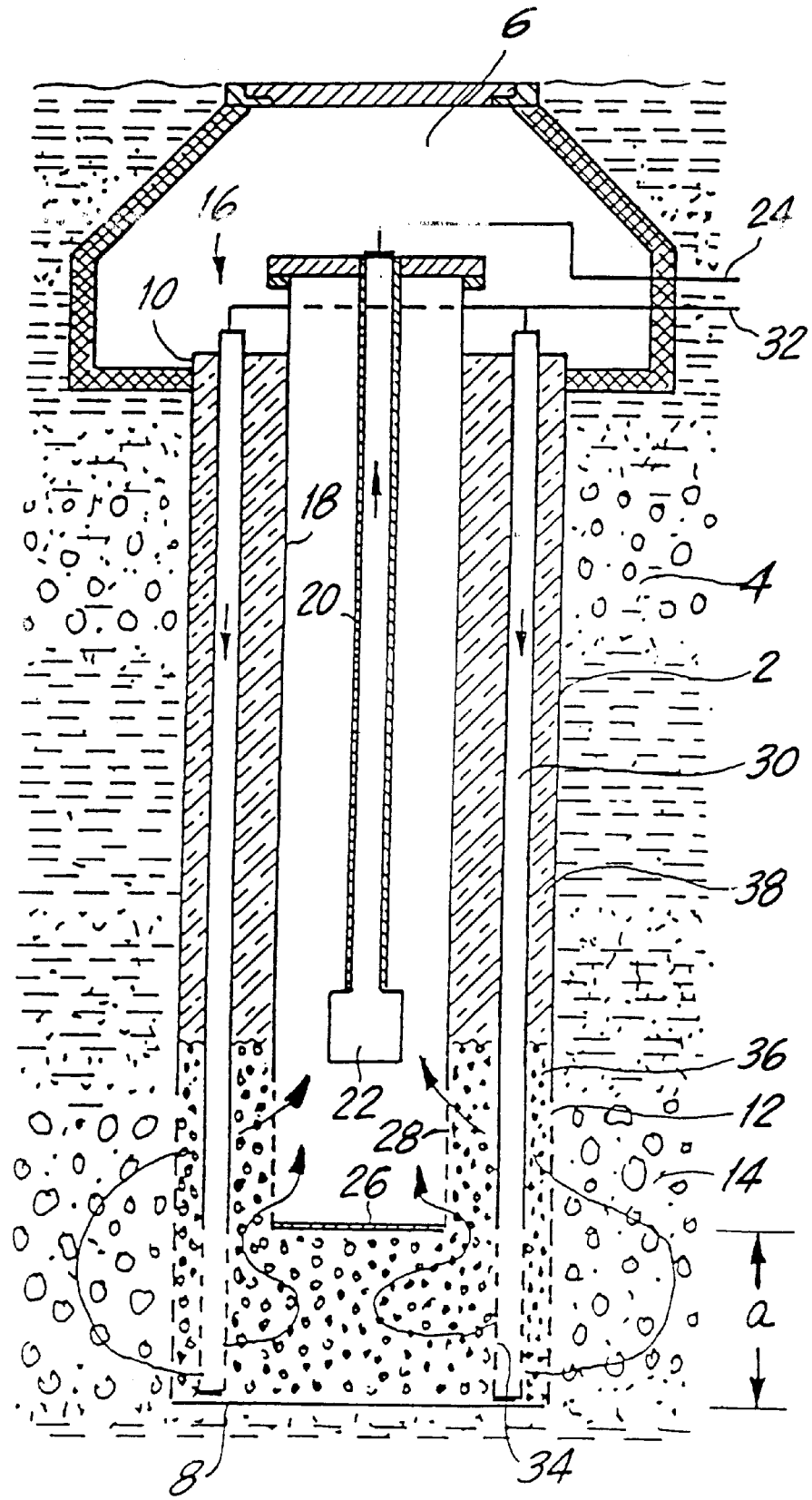

A soil heat exchanger for effecting an energy exchange between the earth soil and an energy exchanger according to the present invention, which is shown in the drawing, is arranged in a borehole 2 which is provided in the ground 4 and opens into a pit 6. The soil heat exchanger includes a preferably steel pipe 10 which lines the wall of the borehole 2 and extends to the bottom of the borehole 2. The steel pipe 10 prevents penetration into the borehole 2 of the surrounding material. In its lower region, which preferably is filled with gravel, the pipe 10 is provided with breakthroughs 12 which connect the surrounding gravel layer with the pipe interior.

Radially inward of the pipe 10, there is provided a return flow region 16 which is limited from inside with a plastic shroud pipe 18. The shroud pipe 18 surrounds a supply flow duct 20, which is formed of an insulation plastic material and serves as a so-called thermoduct. The supply flow duct 20 is provided at its lower end with a pump 22. The supply flow duct 20 extends into the pit 6 and is connected with a flow conduit 24 to an energy exchanger, which is not shown in the drawings in detail. The lower end 26 of the shroud pipe 18 is spaced from the bottom 8 of the borehole 2 by a distance equal, e.g., from 1 to 50 m. In its lower region, the shroud pipe 18 has a plurality of inlet openings 28 for entry of the heated return water from the surrounding region and for guiding the flowing water toward the pump 22.

A plurality of return flow pipes 30, which are arranged along a circle, is provided in the return flow region 16. The return flow pipes 30 have their upper ends connected with a return flow conduit 32 extending from the energy exchanger. The return flow pipes 30 extend down to the bottom 8 of the borehole 2 and are provided, at least beneath the end 26 of the shroud pipe 18, with outlet openings 34. The borehole 2 is packed, at least at a level above the inlet openings 28 of the shroud pipe 18, with a porous filling 36, e.g., with gravel granules having a size from 2 to 8 mm. Above the porous filling 36, the return flow region is provided with a layer 38 which extends up to the upper edge of the borehole 2. The barrier layer 38 may consist, e.g., of a clay material.

The return water, which flows through the outlet opening 34 of the return flow pipes 30, flows into the porous filling 36 and, if necessary, through the breakthroughs 12 of the flow pipe 10 into the surrounding gravel layer 14. The water is heated in these layers and flows upward. The heated return water flows back into the porous filling 36 through the breakthroughs 12. From the porous filling 36, the heated return water flows to the pump 22 and is pumped through the flow duct 20 and the flow conduit 24 into the energy exchanger (not shown).

The soil heat exchanger may have a dept up to 100 m, with the lower end 26 of the shroud pipe 18 being located at a depth from 40 to 70 m and with the porous filling 36 starting from a depth from 10 to 30 m. Of course, other dimensions of the soil heat exchanger can be used.

Through the present invention was shown and described with a reference to a preferred embodiment, various modifications thereof would be apparent to those skilled in the art and, therefore, it is not intended that the invention be limited to the disclosed embodiment and/or details thereof, and departure therefrom can be made within the spirit and scope of the appended claims.

What is claimed is:

1. A soil heat exchanger for effecting an energy exchange between each soil and an energy exchanger, the soil heat exchanger comprising:

a thermoinsulated supply flow duct arranged in a borehole formed in ground;

a pump provided at an end of the flow duct;

a shroud pipe surrounding the flow duct and the pump and having a plurality of inlet openings; and a return flow region for return water located radially outwardly of the shroud pipe and including return flow pipe means, connectable with the energy exchanger, and a porous filling;

wherein the return flow pipe means extends down to a bottom of the borehole and has lateral opening means communicating with an interior of the shroud pipe through the inlet openings of the shroud pipe, wherein the shroud pipe has a lower end thereof spaced from the bottom of the borehole, and the lateral opening means of the return flow pipe means is provided at least beneath the lower end of the shroud pipe, and wherein the porous filling fills the borehole from the borehole bottom and at least up to a level above the inlet openings of the shroud pipe.

2. A soil heat exchanger according to claim 1, further comprising a barrier layer which fills the return flow region, extends above the porous filling, and surrounds the return flow pipe means.

3. A soil heat exchanger according to claim 2, wherein the barrier layer is formed of clay.

4. A soil heat exchanger according to claim 1, further comprising a pipe forming a wall of the borehole and having, in a region of porous filling, a plurality of breakthrough.

5. A soil heat exchanger according to claim 4, wherein the wall-forming pipe is made of metal.

6. A soil heat exchanger according to claim 5, wherein the metal is steel.

7. A soil heat exchanger according to claim 1, wherein the porous filing is formed of gravel.

8. A soil heat exchanger according to claim 7, wherein the gravel consists of granules having a size from about 2 mm to about 8 mm.

* * * * *